US008385630B2

(12) United States Patent
Sizintsev et al.

(10) Patent No.: US 8,385,630 B2
(45) Date of Patent: Feb. 26, 2013

(54) SYSTEM AND METHOD OF PROCESSING STEREO IMAGES

(75) Inventors: Mikhail Sizintsev, Thornhill (CA); Sujit Kuthirummal, Jersey City, NJ (US); Rakesh Kumar, Princeton Junction, NJ (US); Supun Samarasekera, Princeton, NJ (US); Harpreet Singh Sawhney, West Windsor, NJ (US)

(73) Assignee: SRI International, Menlo Park, CA (US)

( * ) Notice: Subject to any disclaimer, the term of this patent is extended or adjusted under 35 U.S.C. 154(b) by 259 days.

(21) Appl. No.: 12/980,590

(22) Filed: Dec. 29, 2010

(65) Prior Publication Data

US 2011/0176722 A1     Jul. 21, 2011

Related U.S. Application Data

(60) Provisional application No. 61/292,291, filed on Jan. 5, 2010.

(51) Int. Cl.
  *G06K 9/46* (2006.01)
  *G01C 3/14* (2006.01)
  *H04N 13/00* (2006.01)
(52) U.S. Cl. ............. 382/154; 382/195; 356/12; 348/42
(58) Field of Classification Search .................. 382/154, 382/195, 304, 303, 260, 205, 299, 209, 199, 382/107, 106, 278, 285; 348/43, 47, 51, 44, 42, E13.014, E13.001, E13.016, E13.02, E13.025, E13.071, E13.073, E13.062, E1.026, E13.074, E13.008, E13.065; 345/419; 356/12
See application file for complete search history.

(56) References Cited

U.S. PATENT DOCUMENTS

| 5,179,441 | A  | * | 1/1993  | Anderson et al. | 348/43  |
| 6,301,370 | B1 | * | 10/2001 | Steffens et al. | 382/103 |
| 7,599,547 | B2 | * | 10/2009 | Sun et al.      | 382/154 |
| 8,009,897 | B2 | * | 8/2011  | Xu et al.       | 382/154 |
| 8,108,119 | B2 | * | 1/2012  | Southall et al. | 701/96  |

* cited by examiner

*Primary Examiner* — Sheela Chawan
(74) *Attorney, Agent, or Firm* — Moser Taboada

(57) ABSTRACT

The present invention is a system and a method for processing stereo images utilizing a real time, robust, and accurate stereo matching system and method based on a coarse-to-fine architecture. At each image pyramid level, non-centered windows for matching and adaptive upsampling of coarse-level disparities are performed to generate estimated disparity maps using the ACTF approach. In order to minimize propagation of disparity errors from coarser to finer levels, the present invention performs an iterative optimization, at each level, that minimizes a cost function to generate smooth disparity maps with crisp occlusion boundaries.

20 Claims, 7 Drawing Sheets

Left pyramid	Disparity	Right pyramid

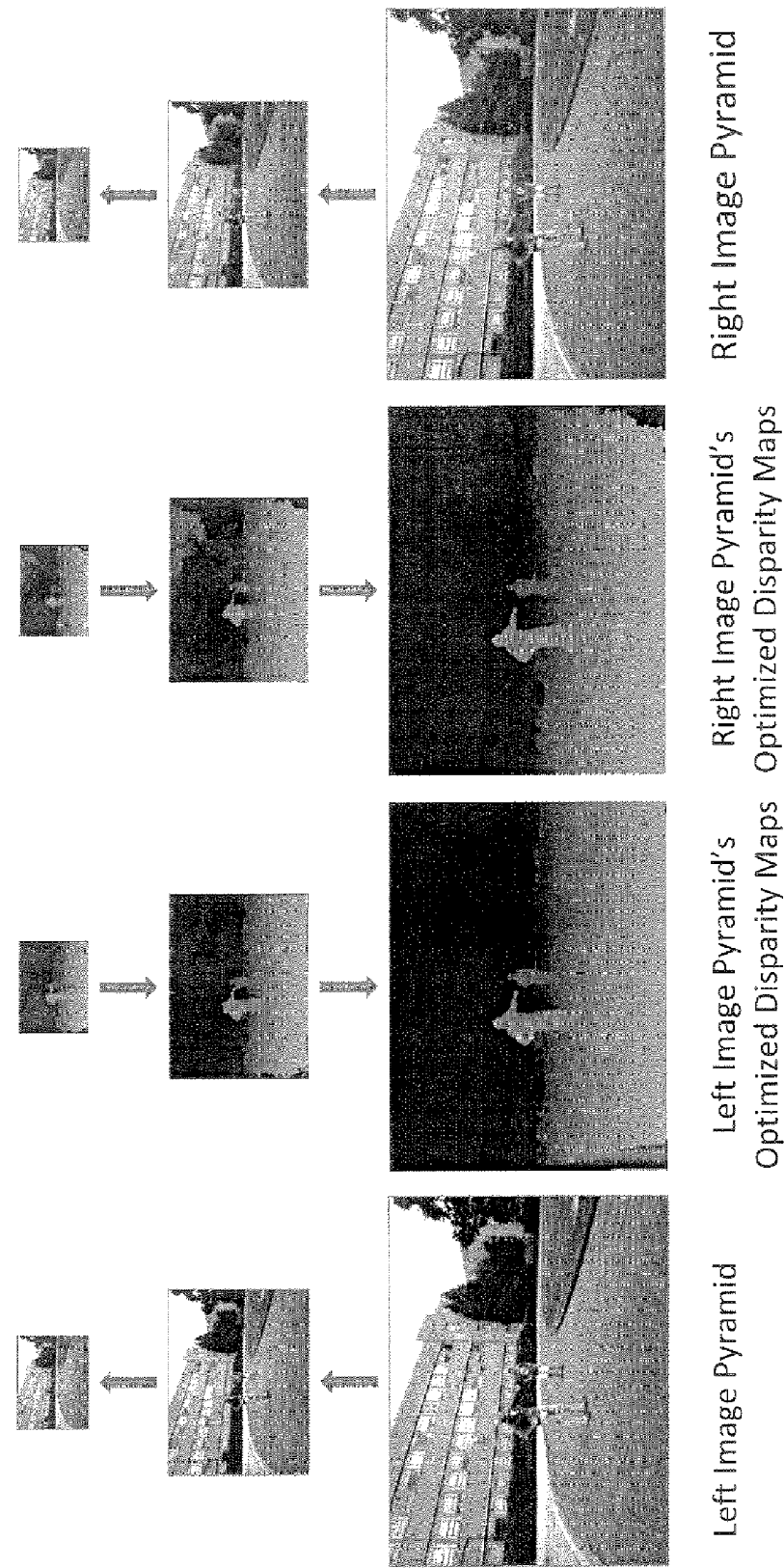

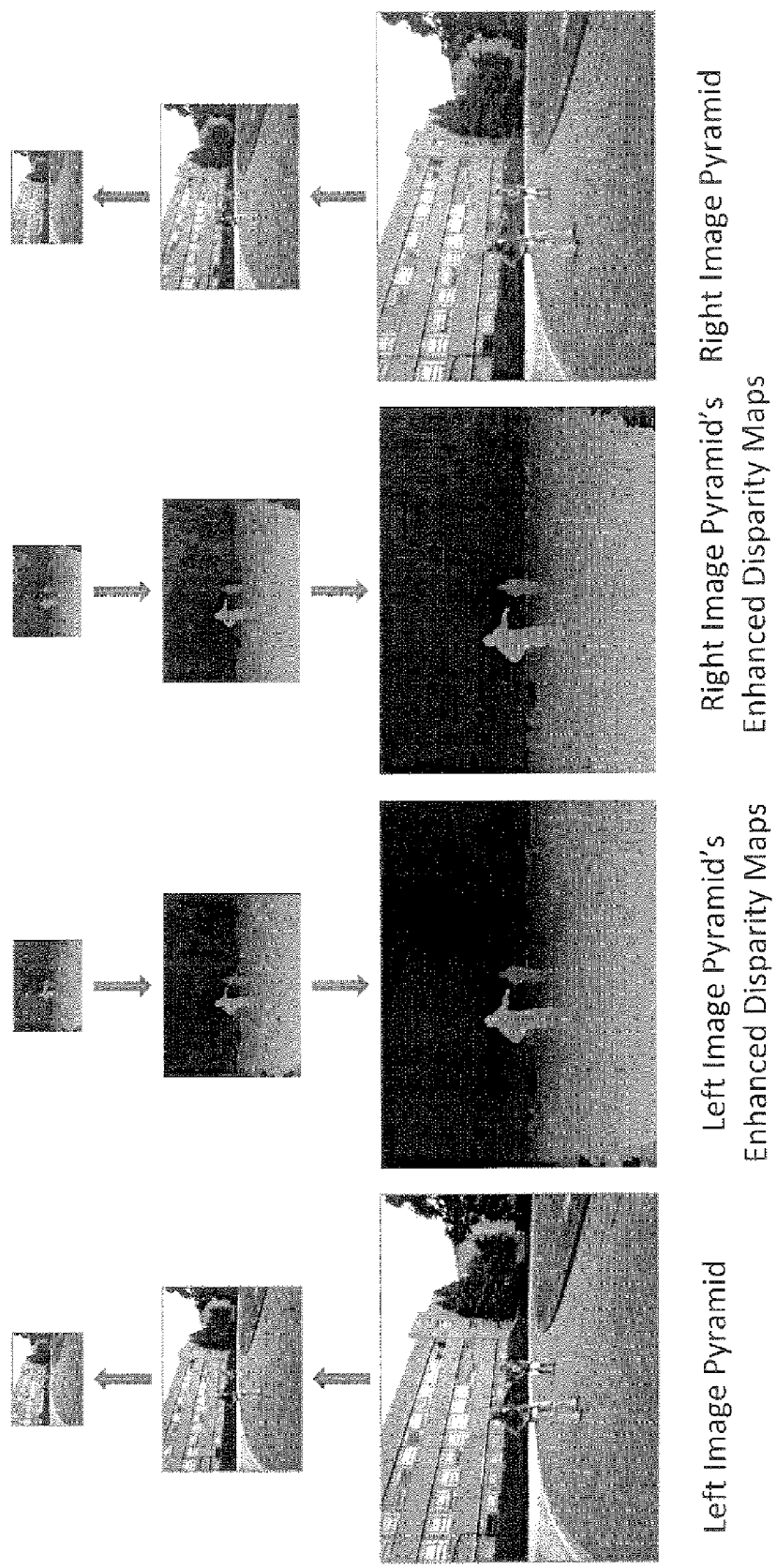

SYSTEM AND METHOD OF PROCESSING STEREO IMAGES

CROSS-REFERENCE TO RELATED APPLICATIONS

This application claims the benefit of United States Provisional Patent Application No. 61/292,291 titled Jan. 5, 2010, and titled, "GPU Accelerated Realtime Stereo For Augmented Reality," which is herein incorporated by reference.

GOVERNMENT RIGHTS IN THIS INVENTION

This invention was made with U.S. government support under contract number FA9200-07-D-0045. The U.S. government has certain rights in this invention.

FIELD OF THE INVENTION

The present invention relates generally to processing of stereo images. More specifically, this invention relates to real time processing of stereo images to produce high quality disparity (range) maps.

BACKGROUND OF THE INVENTION

Dense stereo matching is an important component of many computer vision applications, like 3D reconstruction and robot navigation, and hence has been studied for decades Many recent methods, such as ones described by D. Scharstein and R. Szeliski in "Taxonomy and evaluation of dense two frame stereo correspondence algorithms", *IJCV* 47:7-42, 2002 are based on global or semi-global optimization algorithms. They produce high quality results, but due to their complexity are far from being real time. Other known methods are Local block based methods which are fast and amenable to parallelization and so were among the first to be implemented on Graphics Processing Units (GPUs). However, they typically perform poorly near occlusion boundaries and in low-textured regions, which prompted the development of various post-processing steps.

Recently, some non-local methods have been ported to the GPU such as Dynamic Programming described by Wang et al. in High-quality Real-time Stereo using Adaptive Cost Aggregation and Dynamic Programming", *3DPVT,* 2006, pp 798-805 and Belief Propagation described by Yang et al. in "Realtime global stereo matching using hierarchical belief propagation", *BMVC,* 2006, pp 989-998. These implementations support small image sizes and/or small disparity ranges. Consequently, local methods are still the popular choice for real time stereo implementations. A class of methods that do not fit in this classification of local and non-local methods are those built on a coarse-to fine (CTF) architecture as proposed by M. Sizintsev and R. P. Wildes in "Coarse-to-fine stereo with accurate 3D boundaries," *Image and Vision Computing* 28, 2010, pp. 352-366. A schematic representation of this CTF architecture is illustrated in FIG. 1. Initially, image pyramids are constructed and then stereo estimations are performed progressively from coarser to finer levels of the pyramid. Disparity estimates are propagated from coarser-to-finer levels, while local block based matching is used at each level of the pyramid to perform disparity estimation about the initial guess from the coarser level. Due to their simplicity and parallelizability, these are very fast, and at the same time more accurate than local algorithms applied only at the input resolution. However, CTF stereo is known to perform poorly near occluding boundaries.

To improve performance at occlusion boundaries, an adaptive coarse-to-fine (ACTF) stereo algorithm was proposed by M. Sizintsev and R. P. Wildes in "Coarse-to-fine stereo with accurate 3D boundaries," *Image and Vision Computing* 28, 2010, pp. 352-366. This ACTF stereo algorithm uses non-centered windows for matching and also adaptively upsamples coarser level disparity estimates as illustrated in FIG. 2. So, for every pixel, centered windows, e.g. 3×3 window 20 as shown in FIG. 2 are first utilized to choose the disparity value d with the highest correlation score. Then, a search is performed at all non-centered windows, e.g. 22, 24, which are the same size as the centered window 20 as shown in FIG. 2 that includes the reference pixel, to find the window which has the highest correlation (C) score. This best non-centered window is the centered window for some pixel, and the corresponding disparity value d of that pixel is selected as the disparity value for the reference pixel. The correlation C is defined as below:

$$C = \frac{\sum_i Li \times Ri}{\sqrt{\sum_i L_i^2 \times \sum R_i^2}}$$

where L & R refer to corresponding left and right image patches and i indexes corresponding pixels in the patches. ACTF performs well for most part, but often makes disparity errors such as the one shown in the disparity map in FIG. 3(c) based on the left stereo image in FIG. 3(a) and the right stereo image in FIG. 3(b). As shown in the disparity map of FIG. 3(c), part of the head is cut off and the raised arm appears to have an abnormal shape. These failures are due to the fact that disparity value for a pixel at a pyramid level are drawn only from the immediate coarser level. An incorrect estimate of the disparity value at a coarser level can propagate all the way to the finest level.

The fact that a large number of stereo matching algorithms have been proposed clearly indicates that there exist tradeoffs between speed, flexibility, accuracy and even density of stereo matching. Therefore, there is a need in the art to provide an improved stereo matching algorithm that overcomes the deficiencies of prior art and computes accurate disparity maps in real time while maintaining a high execution speed.

SUMMARY OF THE INVENTION

According to an embodiment of the present invention, the principles of the present invention provide for a real time, robust, and accurate stereo matching system and method based on adaptive coarse-to-fine (ACTF) architecture.

In accordance with the embodiment of the present invention, the present invention provides a system and a method for processing images. The method includes capturing, digitizing and preprocessing stereo imagery of left and right stereo images, constructing left and right pyramids for the left and right stereo images at a plurality of levels, and generating estimated left and right disparity maps of the left and the right image pyramids at the coarsest level of the plurality of the levels. The estimated left and right disparity maps include estimated disparity values at each pixel. The method also includes determining disparity values of all neighboring pixels of each of the pixel in the estimated left and right disparity maps at the coarsest level and computing a first iteration of TotalCost values for each of the estimated disparity value at each pixel and a first iteration of the TotalCost values for the disparity values of the neighboring pixels in the estimated left and right disparity maps at the coarsest level. The method further includes computing a second iteration of TotalCost values using results from the first iteration of the TotalCost values and selecting the disparity value at each said pixel having a minimum value of the first and the second iteration of the TotalCost values to generate optimized left and right disparity maps at the coarsest level.

BRIEF DESCRIPTION OF THE DRAWINGS

It is to be noted, that drawings illustrate only typical embodiments of this invention and are therefore not to be considered limiting of its scope, for the invention may admit to other equally effective embodiments.

FIG. 6A illustrates a schematic representation of different levels of the left and right pyramids computed from the left stereo image and the right stereo image of FIGS. 3a and 3b, respectively and the corresponding optimized disparity maps at the different levels of the pyramids.

FIG. 6B illustrates a schematic representation of different levels of the left and right pyramids computed from the left stereo image and the right stereo image of FIG. 3a and 3b, respectively and the corresponding enhanced disparity maps at the different levels of the pyramids.

DETAILED DESCRIPTION OF THE SPECIFICATION

This present invention relates to processing of stereo images of a scene utilizing a real time, robust, and accurate stereo matching system and method based on a coarse-to-fine architecture. At each image pyramid level, non-centered windows for matching and adaptive upsampling of coarse-level disparities are performed to generate estimated disparity maps using the ACTF approach. In order to minimize propagation of disparity errors from coarser to finer levels, the present invention performs an iterative optimization, at each level, that minimizes a cost function to generate smooth disparity maps with crisp occlusion boundaries. This method represents a significant improvement in image size, disparity range, and execution speed over other real-time stereo methods. Such rapid and accurate stereo greatly benefits several applications. One such application is Augmented Reality (AR application), which requires dense depth estimates with accurate 3D boundaries. The present invention enables inserting virtual characters accurately into scenes with the correct occlusion effects in AR applications Referring to FIG. 4, there is shown a block diagram of functional modules of a system 400 for processing stereo images. The system comprises a stereo image preprocessor module 402 for capturing, digitizing and pre-processing the stereo imagery from sensor(s) (not shown). The stereo imagery comprises of a left stereo image, i.e. left view of the stereo image and a right stereo image, i.e. right view of the stereo image. The pre-processing preferably includes but is not restricted to warping the input stereo images to rectified stereo images. These pre-processed input stereo images are received by a Pyramid generator Module 404 for generating/constructing Gaussian pyramids for the left and right stereo images. The system 400 also includes an Adaptive Disparity Estimation Module 406 for estimating left and right stereo disparity maps for the images at every pyramid level using the ACTF approach. As known in the art, a stereo disparity map is a measurement of the difference in the image projections of a 3D points in two images, preferably the left and the right stereo images. A stereo disparity map, also known as the stereo pixel disparity map measures the amount, in pixels, image projections "shift" between the left and the right stereo images.

Figure 4:
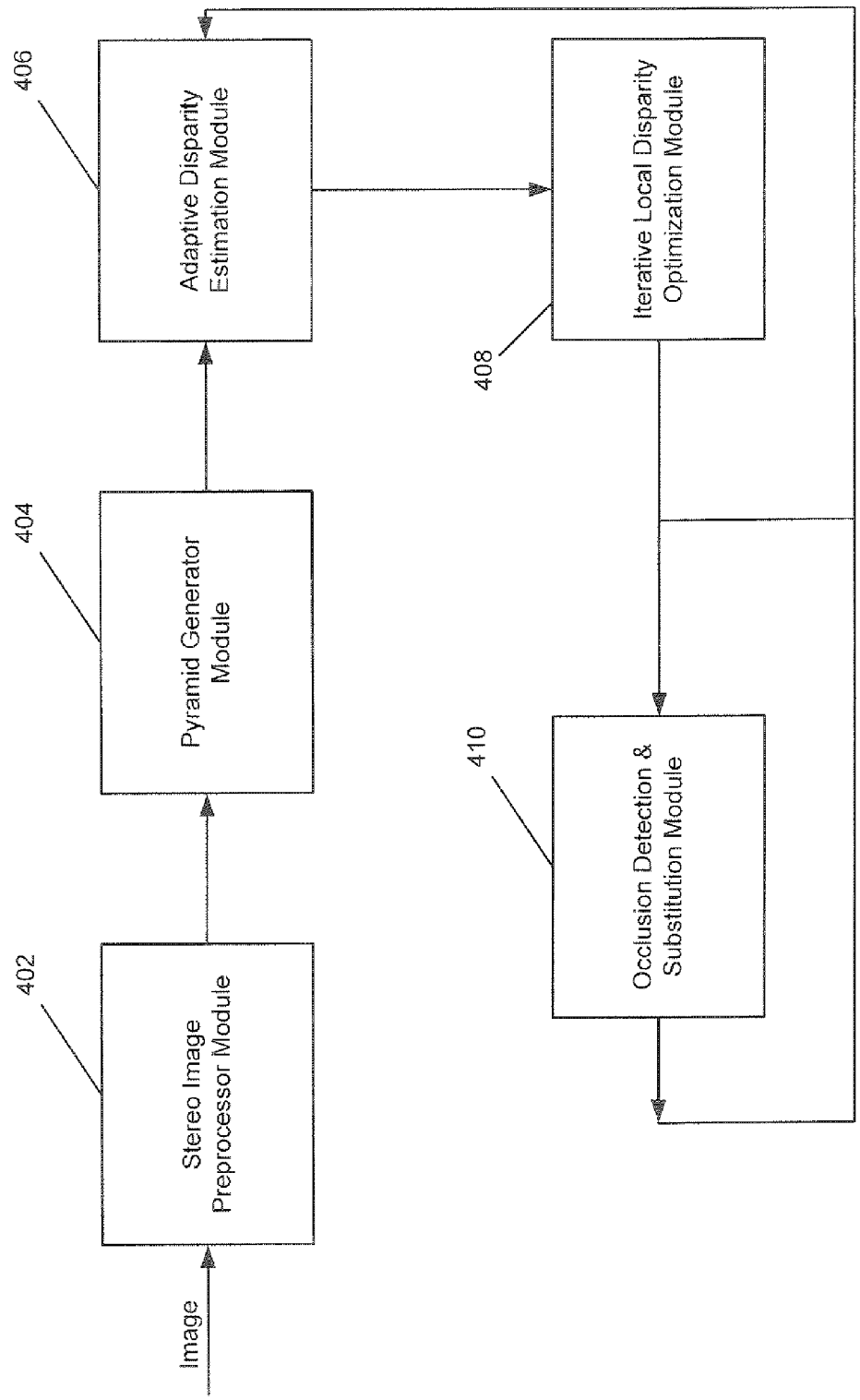
FIG. 4 illustrates a block diagram of a system for processing stereo images in accordance with an embodiment of the present invention.

The system 400 of FIG. 4 further includes an Iterative Local Disparity Optimization Module 408 which functions to generate and test disparity value for each pixel in the left and the right stereo disparity maps at every pyramid level to generate optimized left and right disparity maps. The Iterative Local Disparity Optimization Module 408 is coupled to an Occlusion Detection & Substitution Module 410 which further processes the optimized left and the right stereo disparity maps to detect for regions that may be occluded in one view and further fill in those occluded regions (pixels) to generate enhanced left and right disparity maps.

Figure 1:
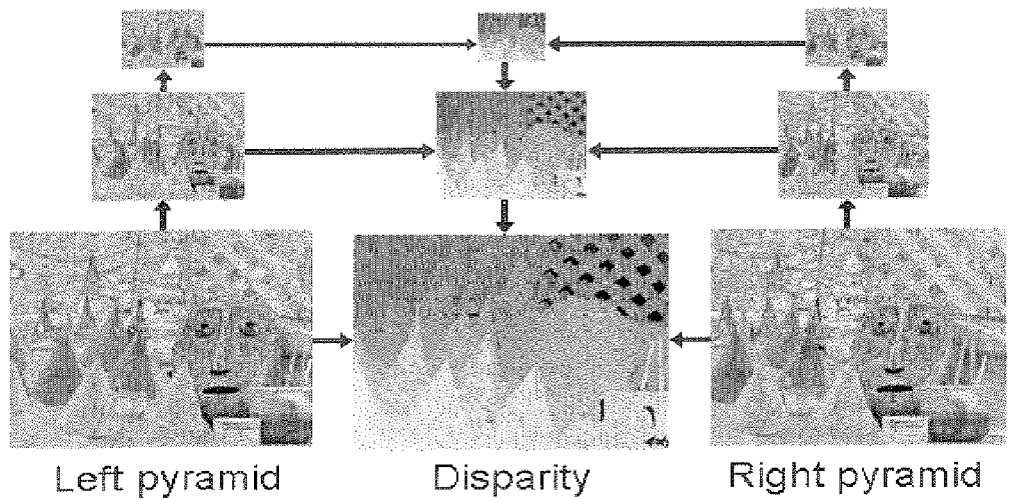
FIG. 1 depicts a schematic representation of Coarse-to-fine stereo (CTF) method of prior art.
Figure 2:
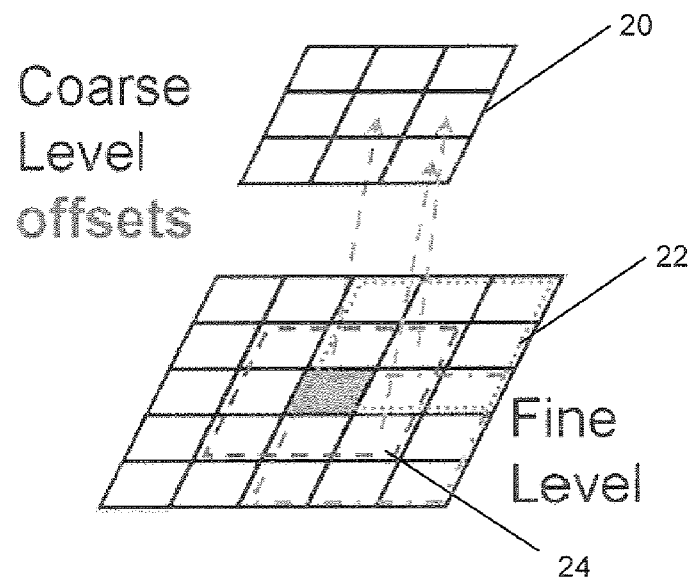
FIG. 2 depicts a schematic representation or Adaptive Coarse-to-fine stereo (ACTF) method of prior art.
Figure 3A:
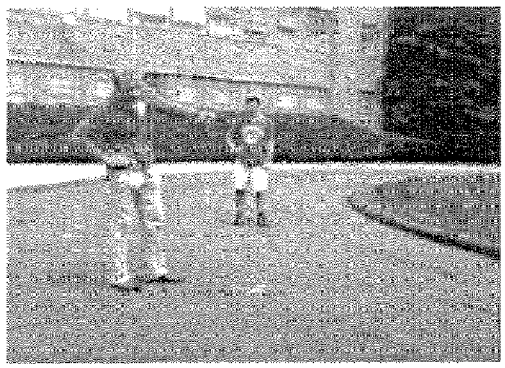
FIG. 3a and FIG. 3b depict left and right stereo images respectively.
Figure 3B:
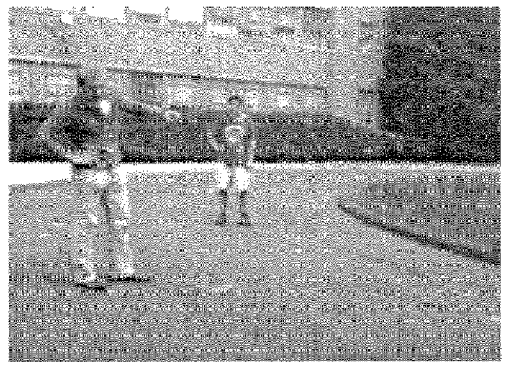
Figure 5:
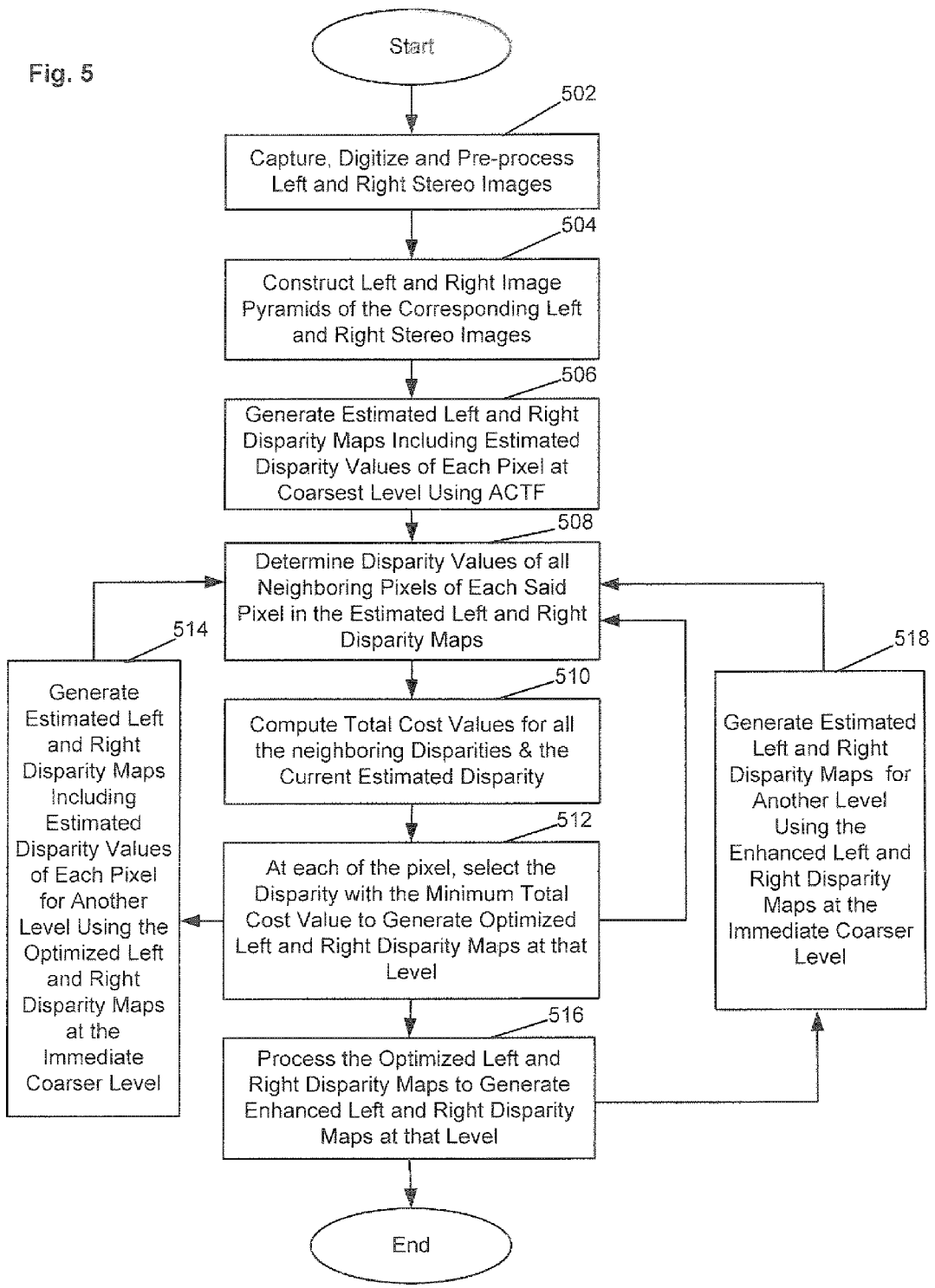
FIG. 5 illustrates a flow chart of a method for processing stereo images in accordance with the embodiment of the present invention.

FIG. 5 illustrates a flow chart of the method for processing of stereo images. Initially, at step 502, an image is received by the Stereo Image Pre-processor Module 402 for capturing, digitizing and preprocessing stereo imagery of left and right stereo images. Examples of such left and right stereo images are shown in FIGS. 3a and 3b respectively. In the next step 504, these left and right stereo images are received by Pyramid Generator Module 404 which functions to construct different levels of Gaussian pyramids for the left and right stereo images as shown in FIG. 6. This pyramid generating method is described by P. J. Burt and E. H. Adelson in "The Laplacian pyramid as a compact image code," *Transactions on Communications*, vol. 31, no. 4, pp. 532-540. Then, at step 506, stereo estimation is performed progressively by the Adaptive Disparity Estimation Module 406 from coarser to finer levels of the left and right image pyramids to generate estimated left and right disparity maps. An example of the left estimated disparity map is shown in the prior art FIG. 3C. The left and right disparity maps are estimated by the adaptive coarse-to-fine (ACTF) approach from coarser to finer levels of the pyramids as described in prior art above by M. Sizintsev and R. P. Wildes in "Coarse-to-fine stereo with accurate 3D boundaries," *Image and Vision Computing* 28, 2010, pp. 352-366. In this ACTF approach, at each pyramid level, for every pixel in the left disparity map, a left disparity value $d_l$ is computed. This $d_l$ is the disparity with the highest correlation score (C), obtained over a set of disparity value centered around the disparity value of the corresponding pixel at the immediate coarser level left disparity map. Similarly, for every pixel in the right disparity map, a right disparity value $d_r$ is computed, which is the disparity with the highest correlation score obtained over a set of disparity value centered around the disparity value of the corresponding pixel at the immediate coarser level right disparity map. The immediate coarser level left and right disparity maps are the maps at the next level of the coarsest level. The coarsest level is defined as the lowest resolution image in the pyramid level and the disparity value for this level are centered around disparity value of 0. A typical example of the coarsest level of the pyramid may preferably be level 6 for a 640×480 resolution image.

The values $d_l$ and $d_r$ obtained for each pixel in the corresponding estimated left and right disparity maps at a particular level by the ACTF approach are used as the input to the iterative local optimization module 408 to compute disparity value values for all neighboring pixels at each pixel p at step 508. So, for every pixel p in the left disparity map at that level, a set of disparity values are evaluated. These values are computed in step 508 drawn from disparities in a neighborhood, preferably 8×16, around p in the current left disparity map at that level. Similarly, for every pixel p in the right disparity map at that level, a set of disparity values, drawn from p's spatial neighborhood (e.g. 8×16) in the current right disparity map at that level, is determined. These disparity values are evaluated by computing the TotalCost for every value at step 510. In the step 510, a first iteration of the TotalCost value is computed So, let $D=d_1, d_2, \ldots d_n$ be the set of disparities in the neighborhood of pixel p, and each disparity di is evaluated/tested at the pixel p using the cost function defined below:

$$TotalCost(d_i)=CC(d_i)+\lambda SC(d_i)$$

where $CC(d_i)$ is the data term, which is defined as 1−C, C being the highest correlation score for disparity di obtained over all centered and non-centered windows that include p, and $\lambda$ is a user defined parameter that can be used to control the smoothness of the estimated left and right disparity maps. So, the data term defines how well the disparity value di fits the data. Using non-centered windows ensures that the data term is correctly characterized near occlusion boundaries. The smoothness term SC measures the compatibility of di, given all the other disparities in the neighborhood and is defined as:

$$SC(di)=\Sigma W(q) \times \min(|d_i-D(q)|,\alpha)$$

where q is a pixel in p's neighborhood and D(q) denotes its current disparity estimate. So, the smoothness term encourages the disparity map to be smooth (i.e. free from perturbations or unevenness). In the present invention, a 9×9 neighborhood is preferably implemented to evaluate the smoothness cost in the above equation. For robustness, the disparity difference, $|d_i-D(q)|$, is truncated and so a constant value, preferably 2 is assigned to $\alpha$. W(q) is a factor that weights the difference $|d_i-D(q)|$. In one embodiment, W(q) is a constant value that is user defined. In another embodiment, W(q) is inversely proportional to the difference between the image intensities of pixels, p and q. So, W(q) would be small if the intensities of p and q are very different, and be large if p and q have very similar intensities. Thus, the factor W(q) would encourage pixels with similar intensities to have similar disparities.

Using the result of the first iteration of the TotalCost values computed in step 510, steps 508 & 510 are repeated in a second iteration to compute a final set of optimized left and right disparity maps at that pyramid level, as illustrated in FIG. 6A. Even though, the above example describes for two iterations of the optimization, one skilled in the art would appreciate that more than two iterations of optimization can be performed in the present invention.

In the next step 512, the disparity value having the minimum TotalCost value is selected for every pixel, p to generate the optimized left and right disparity maps at that level. Being that the present invention provides for a real-time algorithm, each pixel p is independently optimized, i.e. each pixel independently chooses a disparity di that minimizes its respective TotalCost in a greedy fashion. Since each pixel is optimized independently irrespective of its neighbors, the optimization step is completely parallel. Then, at step 514, stereo estimation via the ACTF is performed by the Adaptive Disparity Estimation Module 406, for another pyramid level using the final set of the optimized left and the right disparity maps at the immediate coarser level. The another pyramid level is preferably a next finer (higher resolution) pyramid level. In other words, the final set of the optimized left and right disparity maps at a level are used as input to the ACTF to generate estimated left and right disparity maps for the next pyramid level, which is preferably a less coarse level. In this manner, steps 508 to 514 are repeated for all levels until preferably a finest level (the pyramid level with the same resolution as the input image) to generate the final set of optimized left and right disparity maps at all pyramid levels as shown in FIG. 6A.

In a further embodiment of the present invention, at step 516, the final set of optimized left and right disparity maps at a particular level are further processed by occlusion detection and substitution module 410 to compute enhanced left and right disparity maps as shown in FIG. 6B. This processing includes detecting regions (pixels) that are occluded in one view and further filling those occluded regions with potentially background disparities in the optimized left and right disparity maps at that pyramid level. The identifying of occluded pixels which can be seen only in one view (i.e. in either the left stereo image or the right stereo image) is disclosed in G. Egnal and R. P. Wildes, in "Detecting Binocular Half-Occlusions: Empirical Comparisons of Five Approaches", *IEEE Transactions on Pattern Analysis and Machine Intelligence,* 2002. The disparities at occluded pixels in each of the left and right optimized disparity maps at a pyramid level are substituted with potentially background disparity values. So, for every occluded pixel, a search is carried out vertically and horizontally outwards from each occluded pixel to determine the first non-occluded pixel in each direction. The disparities of the first non-occluded pixel in each of the four directions are collected and then the minimum of these four disparities (which is potentially a background disparity) is chosen to replace, the occluded pixel's disparity. This processing of the occluded pixels further corrects errors due to occlusions in the optimized left and right disparity maps to generate enhanced left and right disparity maps at the said pyramid level. Then, at step 518, similar to the process repeated at step 514 for the optimized left and right disparity maps, stereo estimation via the ACTF is performed by the Adaptive Disparity Estimation Module 406 for the another level, preferably the next finer pyramid level, using the enhanced left and right disparity maps at the immediate coarser level. So, the enhanced left and right disparity maps at a coarser level are used by the ACTF to generate estimated left and right disparity maps for the next level, which is preferably a less coarse level. In this manner, steps 508 to 518 are preferably repeated to generate the enhanced left and right disparity maps at all pyramid levels as shown in FIG. 6B.

As discussed above, the present invention significantly improves disparity estimation, especially when performed at every pyramid level, as this enables smoothness constraints to propagate over large distances at the input image resolution.

Figure 3C:
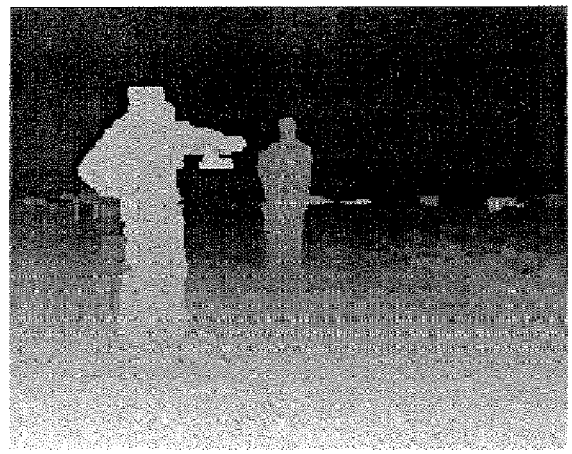
FIG. 3c depicts the disparity map of left stereo image in FIG. 3a using the prior art ACTF method.
Figure 7:
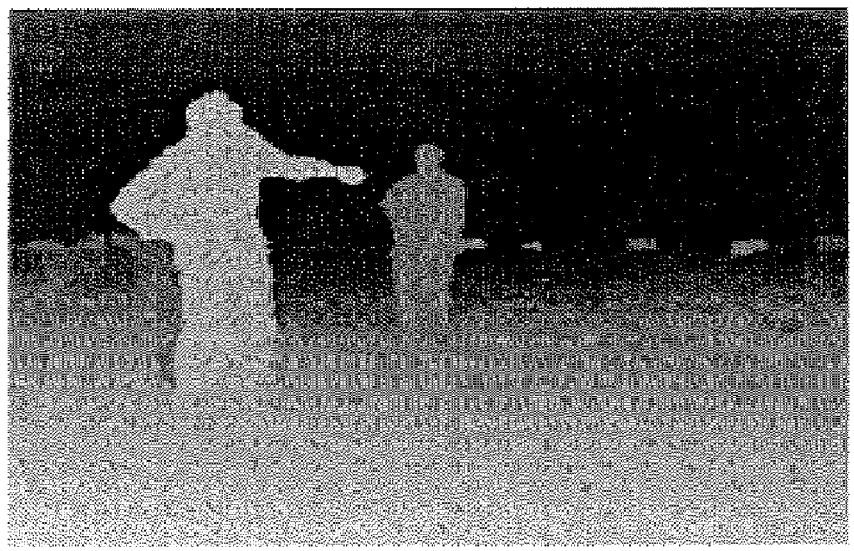
FIG. 7 illustrates a schematic representation of an enhanced stereo disparity map of the left stereo image in FIG. 3a and the right stereo image in FIG. 3b in accordance with the method of the present invention.

This is illustrated by example of the left enhanced disparity map in FIG. 7, which is far more accurate compared to the one in FIG. 3(c), obtained using ACTF only.

Figure 8:
FIG. 8 illustrates a schematic representation of an augmented reality insertion in the stereo image using the enhanced stereo disparity map of FIG. 7.

Furthermore, as discussed above, the methods of the present invention is utilized in an Augmented Reality (AR) application. As known in the art, the Augmented Reality is an application in which computer generated virtual objects are rendered into a real scene with proper occlusion handling. One such reference that discloses Augmented Reality is by J. Schmidt and S. Vogt in "Dense Disparity Maps in Real-Time with an Application to Augmented Reality" *Sixth IEEE Workshop on Applications of Computer Vision* 28, 2002. This Augmented Reality application requires dense depth estimates with accurate 3D boundaries which are achieved by the process defined above in the present invention. FIG. 8 shows an image illustrating an example of the AR application in which a computer-generated character is inserted into the left stereo image of FIG. 3a using the enhanced left disparity map of FIG. 7 with the correct occlusions.

As described above, the present invention provides for an improved stereo matching algorithm that uses coarse-to-fine architecture to compute accurate disparity maps in real time. Furthermore, the algorithm is inherently parallelizable and hence amenable to implementation on Graphic Processing Units which nowadays have hundreds of parallel cores.

Although various embodiments that incorporate the teachings of the present invention have been shown and described in detail herein, those skilled in the art can readily devise many other varied embodiments that still incorporate these teachings without departing from the spirit and the scope of the invention.

The invention claimed is:

1. A computer implemented method for processing stereo images comprising the steps of:
    (a) preprocessing, using a stereo image pre-processor module, left and right stereo images;
    (b) constructing, using a pyramid generator module, left image pyramids of the left stereo image at a plurality of levels;
    (c) constructing, using the pyramid generator module, right image pyramids of the right stereo image at the plurality of levels;
    (d) generating, using an adaptive disparity estimation module, estimated left and right disparity maps at the coarsest level of the plurality of the levels of the left and the right image pyramids, said estimated left and right disparity maps having estimated disparity values at each pixel;
    (e) determining, using an iterative local disparity optimization module, disparity values of all neighboring pixels of each said pixel in the estimated left and right disparity maps at the coarsest level;
    (f) computing, using the iterative local disparity optimization module, a first iteration of TotalCost values for each of the estimated disparity value at each said pixel and the first iteration of the TotalCost values for the disparity values of said neighboring pixels in the estimated left and right disparity maps at the coarsest level; wherein a second iteration of TotalCost values is computed using result of the first iteration of the Total Cost values;
    (g) selecting, using the iterative local disparity optimization module, the disparity at each said pixel having a minimum value of the first and the second iterations of the TotalCost values to generate optimized left and right disparity maps at the coarsest level.

2. The method of claim 1 further comprising repeating step (d) using the optimized left and the right disparity maps at a coarser level to generate estimated left and right disparity maps at another level of said plurality of levels.

3. The method of claim 2 further comprising repeating steps (e) through (g) to generate optimized left and right disparity maps at said another level.

4. The method of claim 3 further comprising repeating steps (d) through (g) to generate optimized left and right disparity maps at all of said plurality of levels.

5. The method of claim 1 wherein said computing Totalcost values are generated as $$\text{TotalCost}(d_i) = CC(d_i) + \lambda SC(d_i)$$

where $CC(d_i)$ is a data term, which is defined as 1−C, C being the highest correlation score for disparity di obtained over all centered and non-centered windows that include pixel, p, SC is the smoothness term that measures the compatibility of di and $\lambda$ is a user defined parameter to control the smoothness of the estimated left and right disparity maps.

6. The method of claim 5 wherein said smoothness term is generated as $$SC(di) = \Sigma W(q) \times \min(|d_i - D(q)|, \alpha)$$

where q is a pixel in p's neighborhood and D(q) denotes its current disparity estimate, W(q) is one of a constant value or a value inversely proportional to the difference in intensities of p and q, and $\alpha$ is a constant value.

7. The method of claim 5 wherein said correlation (C) is generated as $$C = \frac{\sum_i Li \times Ri}{\sqrt{\sum_i L_i^2 \times \sum R_i^2}}$$

where L corresponds to the left image patch and R corresponds to the right image patch and i indexes corresponding pixels in the left and the right image patches.

8. The method of claim 1 further comprising detecting, using occlusion detection and substitution module, occluded pixels in the left and the right optimized disparity maps at the coarsest pyramid level and substituting the occluded pixels in the optimized left and right disparity maps at that level to generate enhanced left and right disparity maps at the coarsest level.

9. The method of claim 8 wherein said substituting comprising identifying the neighboring non-occluded pixel with a smallest disparity value and substituting the occluded pixel's disparity with said smallest disparity value.

10. The method of claim S further comprising repeating step (d) using the enhanced left and the right disparity maps at the coarsest level to generate estimated left and right disparity maps at another level of said plurality of levels.

11. The method of claim 10 further comprising repeating steps (e) through (g) to generate optimized left and right disparity maps at said another level.

12. The method of claim 11 comprising detecting occluded pixels in the left and the right optimized disparity maps at said another level and substituting the occluded pixels in the optimized left and right disparity maps at said another level to generate enhanced left and right disparity maps at said another level.

13. The method of claim 11 further comprising repeating steps (d) through (g) to generate optimized left and right disparity maps at all of said plurality of levels.

14. The method of claim 13 further comprising detecting occluded pixels in the left and the right optimized disparity maps at all of said plurality of levels and substituting the occluded pixels at each of the optimized left and right disparity maps to generate enhanced left and right disparity maps at all of said plurality of levels.

15. A system for processing stereo images comprising:
a stereo image preprocessor module for capturing, digitizing and preprocessing stereo imagery of left and right stereo images;
a pyramid generator module for constructing left and right pyramids for the left and right stereo images at a plurality of levels;
an adaptive disparity estimation module for generating estimated left and right disparity maps of the left and the light image pyramids at the coarsest level of the plurality of the levels, said estimated left and right disparity maps having estimated disparity values at each pixel; and
an iterative local disparity optimization module for determining disparity values of all neighboring pixels of each said pixel in the estimated left and right disparity maps at the coarsest level, said iterative local disparity optimization module for computing a first iteration of Total-Cost values for each of the estimated disparity value at each said pixel and a first iteration of the TotalCost values for the disparity values of said neighboring pixels in the estimated left and right disparity maps at the coarsest level, said iterative local disparity optimization module for computing a second iteration of TotalCost values using results from the first iteration of the Total-Cost values; said iterative local disparity optimization module for selecting the disparity value at each said pixel having a minimum value of the first and the second iteration of the TotalCost values to generate optimized left and right disparity maps at the coarsest level.

16. The system of claim 15 wherein said adaptive estimation module functions to generate estimated left and right disparity maps at another level of said Plurality of levels using the optimized left and the right disparity maps at the coarsest level, and said iterative local disparity optimization module functions to generate optimized left and right disparity maps at said another level using the estimated left and right disparity maps at said another level.

17. The system of claim 16 wherein said adaptive estimation module functions to generate estimated left and right disparity maps at all of said plurality of levels and said local disparity optimization module functions to generate said optimized left and right disparity maps at said all of the plurality of levels.

18. The system of claim 15 further comprising an occlusion detection and substitution module, to detect occluded pixels in the left and the right optimized disparity maps at the coarsest level and fill in the occluded pixels in the optimized left and right disparity maps to generate enhanced left and right disparity maps at the coarsest level.

19. The system of claim 18 wherein said adaptive estimation module functions to generate estimated left and right disparity maps at another level of said plurality of levels using the enhanced left and the right disparity maps at the coarsest level, said iterative local disparity optimization module functions to generate optimized left and right disparity maps at said another level using the estimated left and right disparity maps at said another level, said occlusion detection and substitution module, to detect occluded pixels in the left and the right optimized disparity maps at said another level and substitute the occluded pixels in the optimized left and right disparity maps to generate enhanced left and right disparity maps at said another level.

20. The system of claim 19 wherein said adaptive estimation module functions to generate estimated left and right disparity maps at all levels of said plurality of levels, said local disparity optimization module functions to generate optimized left and right disparity maps at said all levels, and said occlusion detection and substitution module function to detect occluded pixels in the left and the right optimized disparity maps at said all levels and substitute the occluded pixels at each of the optimized left and right disparity maps to generate enhanced left and right disparity maps at said all levels.

* * * * *